United States Patent
Gunasekara et al.

(10) Patent No.: US 11,375,437 B2
(45) Date of Patent: Jun. 28, 2022

(54) MANAGEMENT FRAMES AND USAGE IN A WIRELESS NETWORK ENVIRONMENT

(71) Applicant: Time Warner Cable Enterprises LLC, New York, NY (US)

(72) Inventors: Don Gunasekara, Reston, VA (US); Laxman Nallani, Aldie, VA (US); Ahmed Bencheikh, Lorton, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 897 days.

(21) Appl. No.: 14/877,130

(22) Filed: Oct. 7, 2015

(65) Prior Publication Data
US 2017/0105110 A1    Apr. 13, 2017

(51) Int. Cl.
*H04W 8/00*   (2009.01)
*H04W 48/20*  (2009.01)
*H04W 48/16*  (2009.01)
H04W 84/12   (2009.01)

(52) U.S. Cl.
CPC .......... *H04W 48/16* (2013.01); *H04W 84/12* (2013.01)

(58) Field of Classification Search
CPC .............................. H04W 48/16; H04W 84/12
See application file for complete search history.

(56) References Cited

U.S. PATENT DOCUMENTS

| | | | |
|---|---|---|---|
| 8,503,415 B2 | 8/2013 | Kuo | |
| 2005/0239463 A1* | 10/2005 | Lagnado | H04W 48/18 455/435.2 |
| 2015/0139010 A1* | 5/2015 | Jeong | H04W 48/20 370/252 |
| 2015/0156709 A1* | 6/2015 | Shukla | H04W 48/16 370/338 |
| 2015/0257062 A1* | 9/2015 | Hara | H04W 36/0083 370/331 |
| 2016/0249287 A1* | 8/2016 | Xie | H04W 12/00 |
| 2017/0250763 A1* | 8/2017 | Zinchenko | H04B 17/23 |

* cited by examiner

*Primary Examiner* — Melvin C Marcelo
(74) *Attorney, Agent, or Firm* — Armis IP Law, LLC

(57) ABSTRACT

Instead of monitoring a wireless region for beacons, to learn of availability of different wireless access points in a particular geographical region, an end user-operated communication device generates a network discovery request message. The communication device initiates wireless broadcast of the network discovery request message from the user-operated communication device to any of one or more listening non-beacon-generating wireless access points in a wireless network environment. Each of the non-beacon generating wireless access points receiving the network discovery request message from the user-operated communication device produces a respective network discovery response message including network identity information (such as one or more SSIDs) associated with the respective non-beacon generating wireless access point. The non-beacon generating wireless access points transmit network discovery response messages to the user-operated communication device, informing the communication device of network availability.

14 Claims, 10 Drawing Sheets

MANAGEMENT FRAMES AND USAGE IN A WIRELESS NETWORK ENVIRONMENT

BACKGROUND

Conventional computer devices typically have the ability to identify a presence of one or more WiFi™ access points in a corresponding geographical region.

For example, conventional wireless access points automatically and repeatedly generate beacons (i.e., wireless communications) in a respective geographical region to notify any computer devices of their presence. Each generated beacon includes a so-called Service Set Identifier (SSID) value. In general, an SSID is a human-readable network name assigned to a respective network. Via automatically generated beacons, a communication device is able to merely monitor a geographical region for beacons to identify names of available wireless networks.

In addition to passive techniques of receiving beacons to detect presence of one or more wireless access points in a corresponding geographical region, according to conventional technology, a respective communication device can generate a wireless communication to elicit a response from any of one or more wireless access points in a geographical region. For example, a computer device can transmit a wireless query signal (e.g., a probe request) in a geographical region. In response to the wireless query signal, any of one or more active WiFi™ network access points in the geographical region will respond with a probe response, including information about the respective access point.

Via information from each of the access points, the operator of a computer device can identify which, if any, WiFi™ networks are available for use in the region.

BRIEF DESCRIPTION OF EMBODIMENTS

Use of conventional wireless networks suffer from a number of deficiencies. For example, according to conventional WiFi™ deployment, a wireless access point can be configured to transmit a beacon every 100 milliseconds for each SSID that the wireless access point supports, regardless of whether any communication devices are present in the geographical region or not. In such an instance, when a respective wireless access point supports four SSIDs, the wireless access point generates and transmits (4 SSIDs*10 beacons/second*60 seconds/minute*60 minutes/hour*24 hours/day=) 3,456,000 beacons a day.

The present disclosure includes the observation that broadcasting wireless beacons in accordance with conventional techniques needlessly consumes a substantial amount of wireless bandwidth.

In contrast to conventional techniques, embodiments herein include providing more efficient use of an available wireless bandwidth.

More specifically, instead of monitoring a wireless region for beacons, to learn of availability of different wireless access points in a particular geographical region, an end user-operated communication device is configured to generate a network discovery request message. The communication device initiates wireless broadcast of the network discovery request message from the user-operated communication device to any of one or more listening non-beacon-generating wireless access points in a wireless network environment. Each of the non-beacon generating wireless access points receiving the network discovery request message from the user-operated communication device produces a respective network discovery response message including network identity information (such as one or more SSIDs) associated with the respective wireless access point. The non-beacon generating wireless access point transmits the network discovery response message to the user-operated communication device.

In one embodiment, among other information, each network discovery response message includes network identity information associated with the corresponding non-beacon-generating wireless access point generating the network discovery response.

Accordingly, via an active inquiry by a communication device (such as a client or end user equipment), each of non-beacon-generating wireless access point apprises the user-operated communication device of the availability of the wireless access point and corresponding one or more available wireless networks.

Embodiments herein are useful over conventional techniques. For example, in contrast to conventional techniques in which each wireless access point automatically generates multiple beacons each second to notify in-range communication devices of their availability, embodiments herein include substantially reducing (such as by eliminating) generation of beacons from a wireless access point to provide more efficient use of a network. That is, non-beacon-generating wireless access points according to embodiments herein do not automatically transmit beacons as in conventional wireless systems. According to embodiments herein, bandwidth previously supporting transmission of the wireless beacons is now available to support conveyance of payload information, providing users higher data throughput.

In accordance with further embodiments, the network discovery request message generated by the communication device can include any suitable information needed to trigger an authentication request to the access point.

For example, in one embodiment, the network discovery request (such as one or more frames of information) includes a network address assigned to the corresponding user-operated communication device as well as other information such as attributes of network types to which the end user-operated communication device prefers to establish a wireless communication link.

Additionally or alternatively, note that the non-beacon generating wireless access point receiving the network discovery request can be configured to generate a corresponding network discovery response message to include attributes specifying types of different networks supported by the non-beacon-generating wireless access point.

Additionally or alternatively, the network discovery request generated by the user-operated communication device can include information can further indicate whether the communication device is passpoint (such as Hotspot 2.0) enabled. In such an instance, assuming that the network discovery request indicates that the communication device is passpoint enabled, the non-beacon generating wireless access point produces the network discovery response message to indicate one or more (passpoint) service providers and corresponding wireless networks supported by the wireless access point.

In yet further embodiments, in certain instances, the communication device repeatedly broadcasts the wireless network discovery request message (such as multiple times each second) in the wireless network environment such as until the communication device receives the network discovery response message from the non-beacon-generating wireless access point. Thus, if needed, such as in an instance in which the wireless access point does not respond to an initial wireless query (such as a first network discovery request) generated by the communication device, the communication device repeatedly transmits multiple wireless network discovery requests in the geographical region.

In accordance with yet additional embodiments, because the wireless access points do not automatically generate beacons, in certain instances, the communication device transmits the wireless query (network discovery request message) prior to receiving notification of any presence information from the non-beacon-generating wireless. For example, the network discovery request message can be a first wireless query generated by the end user communication device in the wireless network environment to query the non-beacon-generating wireless access point to establish a wireless communication link. The wireless access point generates the network discovery response based on receipt of the first wireless query, providing notification that the non-beacon generating wireless access point is present in a wireless region.

In accordance with another embodiment, the non-beacon-generating wireless access point measures a wireless power level of receiving the network discovery request message from the communication device. The wireless access point generates the network discovery response message to include power signal level information indicating the measured wireless power level at which the non-beacon-generating wireless access point received the network discovery request message from the communication device. Accordingly, in such an embodiment, the communication device learns of a relative ability of the non-beacon generating wireless access point to support a respective wireless communication link with the communication device.

In accordance with further embodiments, there are multiple non-beacon generating wireless access points presence in a geographical region in which the communication device broadcasts the network discovery request message. Assume that the communication device receives communications such as a network discovery response from a first non-beacon generating wireless access point and that the strength of receiving the network discovery response is below a threshold level.

In response to detecting that the strength of receiving communications from the wireless access point is below a threshold level, the communication device can be configured to generate a subsequent network discovery request message in the geographical region to learn of any other wireless access points that may be able to provide a better wireless communication link to the communication device. Assume that the communication device receives a response from a second non-beacon-generating wireless access point in which corresponding received communications from the second non-beacon generating wireless access point are substantially above a threshold value. In such an instance, the communication device initiates a handoff of a respective wireless communication link to the second non-beacon-generating wireless access point instead of the first non-beacon generating wireless access point.

Accordingly, signal strength information received in the one or more network discovery responses can be used by the communication device to determine which of multiple eligible non-beacon-generating wireless access point in which to wirelessly connect.

In accordance with yet further embodiments, as a response to the one or more broadcasted network discovery request messages, the communication device receives network discovery response messages from multiple non-beacon-generating wireless access points in the wireless network environment; each of the network discovery response messages indicates a power level (such as signal strength) of the respective wireless access point receiving the network discovery request messages. The communication device analyzes the network discovery response messages to identify a non-beacon-generating wireless access point of the multiple non-beacon-generating wireless access points in which to establish the wireless communication link. In one embodiment, the communication device chooses amongst one or more non-beacon-generating wireless access points that receives the network discovery request at the highest signal strengths sufficient to provide data throughput at a desired rate.

As previously discussed, embodiments herein are useful over conventional systems. For example, embodiments herein reduce overhead management traffic by eliminating the need repeatedly transmit beacons, reducing channel consumption and interference.

These and other more specific embodiments are disclosed in more detail below.

Note that any of the resources as discussed herein can include one or more computerized devices, communication devices, wireless access points, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiment as described herein includes a computer readable storage medium, system, hardware, etc., having instructions stored thereon. The instructions, when executed by computer processor hardware, cause the computer processor hardware of the system to: generate a network discovery request message; initiate wireless broadcast of the network discovery request message from the end user communication device to a listening non-beacon-generating wireless access point in a wireless network environment; and receive a network discovery response message from the non-beacon-generating wireless access point, the network discovery response message including network identity information associated with the non-beacon-generating wireless access point.

Another embodiment as described herein includes computer readable storage medium, system, hardware, etc., having instructions stored thereon. The instructions, when executed by computer processor hardware, cause the computer processor hardware of the system to: at a wireless access point configured to prevent non-solicited transmission of wireless communications indicating presence of the first wireless access point in a network environment, performing operations of: receive a network discovery request message from an end-user-operated communication device; in response to receiving the network discovery request message, generate a network discovery response message including network identity information assigned to the wireless access point; and transmit the network discovery response message from the wireless access point to the end-user operated communication device.

Note that the ordering of the operations can vary. For example, any of the processing operations as discussed herein can be performed in any suitable order.

Other embodiments of the present disclosure include software programs and/or respective hardware to perform any of the method embodiment operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for providing more efficient use of wireless bandwidth in a wireless network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
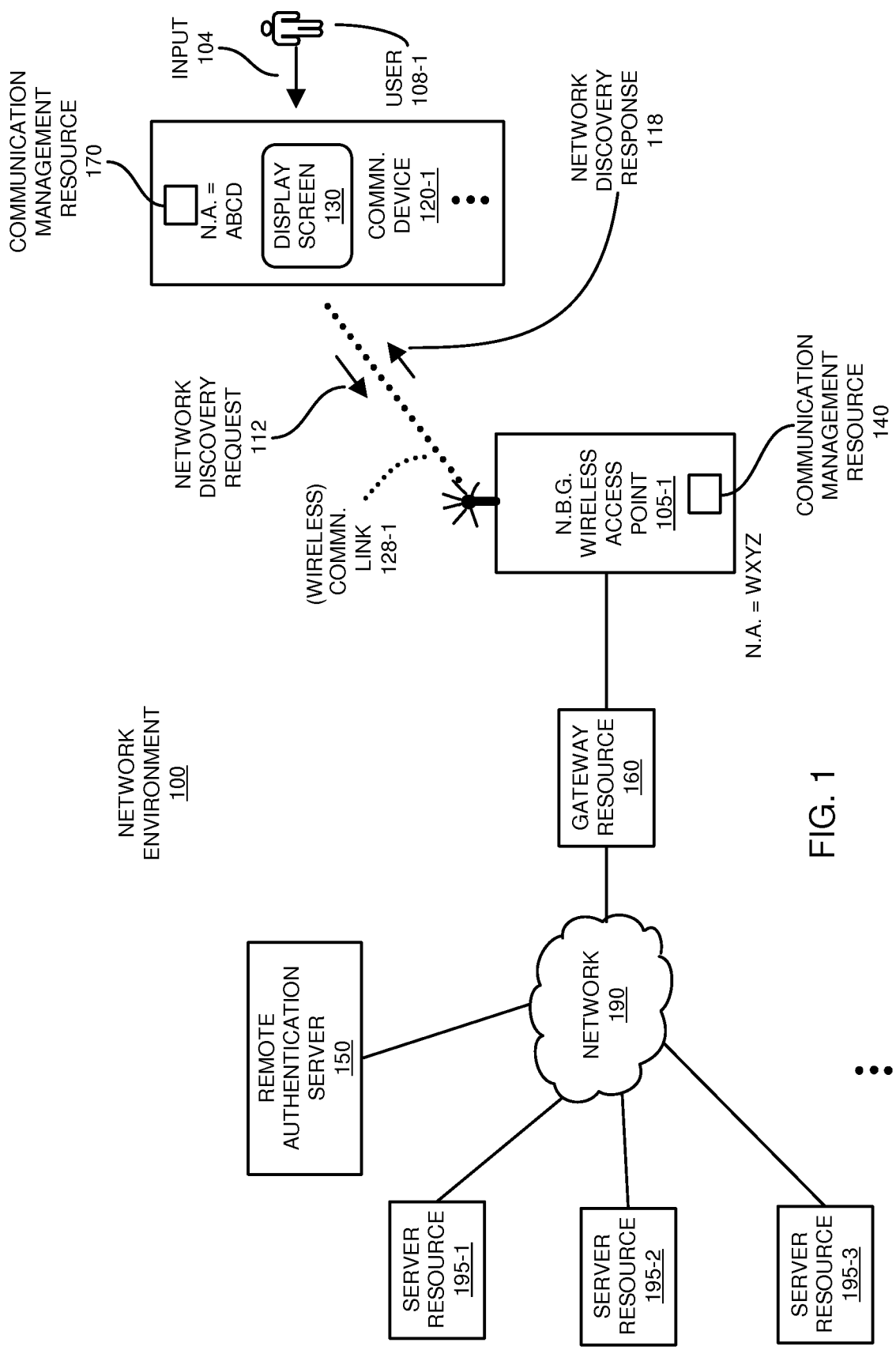
FIG. 1 is an example diagram illustrating a network environment including multiple non-beacon generating wireless access points according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In accordance with one embodiment, a network environment includes one or more non-beacon-generating wireless access points that selectively provide access to a corresponding network such as the Internet. Instead of passively monitoring a wireless region for beacons according to conventional techniques, to learn of availability of different wireless access points in a particular geographical region, an end user-operated communication device is required to generate a network discovery request message according to embodiments herein. For example, in one embodiment, a communication device initiates wireless broadcast of a network discovery request message from the user-operated communication device to any of one or more non-beacon-generating wireless access points present in a wireless network environment.

Each of the non-beacon generating wireless access points receiving the network discovery request message from the user-operated communication device produces a respective network discovery response message including network identity information (such as one or more SSIDs) supported by the respective non-beacon generating wireless access point. The non-beacon generating wireless access points transmit the network discovery responses message to the user-operated communication device.

In one embodiment, among other information, each network discovery response message includes network identity information associated with the corresponding non-beacon-generating wireless access point generating the network discovery response. Accordingly, via an active inquiry by a communication device (such as a client or end user equipment), each of the non-beacon generating wireless access points apprises the user-operated communication device of the wireless network availability.

Now, more specifically, FIG. 1 is an example diagram illustrating a network environment including multiple non-beacon generating wireless access points according to embodiments herein.

Note that each of the resources such as wireless access point 105-1, remote authentication server 150, gateway resource 160, server resource 195-1, server resource 195-2, server resource 195-3, communication device 120-1, etc., represents or includes appropriate hardware, software, or a combination of hardware and software to carry out functionality as discussed herein.

In this example embodiment, in contrast to conventional wireless systems as previously discussed, each of the wireless access points 105 is a non-beacon-generating wireless access point. The non-beacon-generating wireless access points in network environment 100 do not repeatedly transmit beacons to notify nearby communication devices of their availability.

More specifically, the wireless access point 105-1 includes a first wireless communication interface to wirelessly communicate with multiple communication devices in network environment 100. In one embodiment, the first wireless communication interface is a passive interface configured to prevent non-solicited transmission of wireless communications indicating a presence of the first wireless access point in the network environment. In other words, in contrast to conventional systems as previously discussed, the first interface of wireless access point 105-1 does not automatically transmit beacons.

The wireless access point 105-1 further includes a second communication interface (such as a hardware link) to communicate with gateway resource 160 and remote network 190.

Because each of the wireless access points 105 including wireless access point 105-1 is configured not to transmit beacons in the network environment 100, instead of passively monitoring a wireless region for beacons according to conventional techniques and to learn of availability of different wireless access points in network environment 100, the communication management resource 170 in the end user-operated communication device 120-1 (operated by user 108-1) generates a network discovery request 112 (message) when the user 108-1 would like to access network 190.

In one embodiment, in response to detecting that the user 108-1 would like to connect to network 190, the communication management resource 170 in communication device 120-1 generates and transmits network discovery request 112 to the non-beacon-generating wireless access point 105-1. In one embodiment, the communication management resource 170 attempts to establish the wireless communication link 128-1 in response to receiving input 104 such as an input command to execute a respective browser application requiring use of wireless communication link 128-1 to access the remote network 190.

More specifically, in one embodiment, in furtherance of establishing a wireless communication link 128-1 on behalf of the user 108-1, the communication device 120-1 initiates wireless broadcast of a network discovery request 112 from the user-operated communication device 120-1 to any of one or more listening non-beacon-generating wireless access points 105 present in network environment 100.

In one embodiment, the network discovery request 112 is a first wireless query generated by the end user communication device 120-1 in the wireless network environment 100 to establish a wireless communication link 128-1 with the non-beacon-generating wireless access point 105-1. The end user communication device 120-1 transmits the first wireless query (network discovery request 112) prior to receiving any presence notification from the non-beacon-generating wireless access point 105-1. In other words, the communication device 120-1 is not aware that wireless access point 105-1 is available for present in the network environment 100 prior to transmitting the network discovery request 112.

Note that it is possible that the wireless access point 105-1 may not receive the first network discovery request 112 generated by the communication device 120-1. In such an instance, the wireless access point 105-1 will not respond to the network discovery request 112. In one embodiment, the communication device 120-1 repeatedly broadcasts the wireless network discovery request 112 in the wireless network environment 100 until the end user communication device 120-1 is satisfied of receiving one or more network discovery response messages from one or more listening non-beacon-generating wireless access points.

In this example embodiment, assume that the non-beacon generating wireless access point 105-1 receives the network discovery request 112 from the user-operated communication device 120-1. In response to receiving the network discovery request 112, the wireless access point 105-1 produces a respective network discovery response 118 (message) including network identity information (such as one or more SSIDs) associated with the respective non-beacon generating wireless access point 105-1. The non-beacon generating wireless access point 105-1 transmits the network discovery response 118 to the user-operated communication device 120-1.

In one embodiment, among other information, the network discovery response 118 includes network identity information (such as SSID information) associated with the corresponding non-beacon-generating wireless access point generating the network discovery response 118. Accordingly, via an active inquiry by a communication device 120-1 (such as a client or end user equipment), and via network discovery response 118, the non-beacon generating wireless access point 105-1 apprises the user-operated communication device 120-1 of the availability of the one or more wireless networks provided by wireless access point 105-1.

Figure 2:
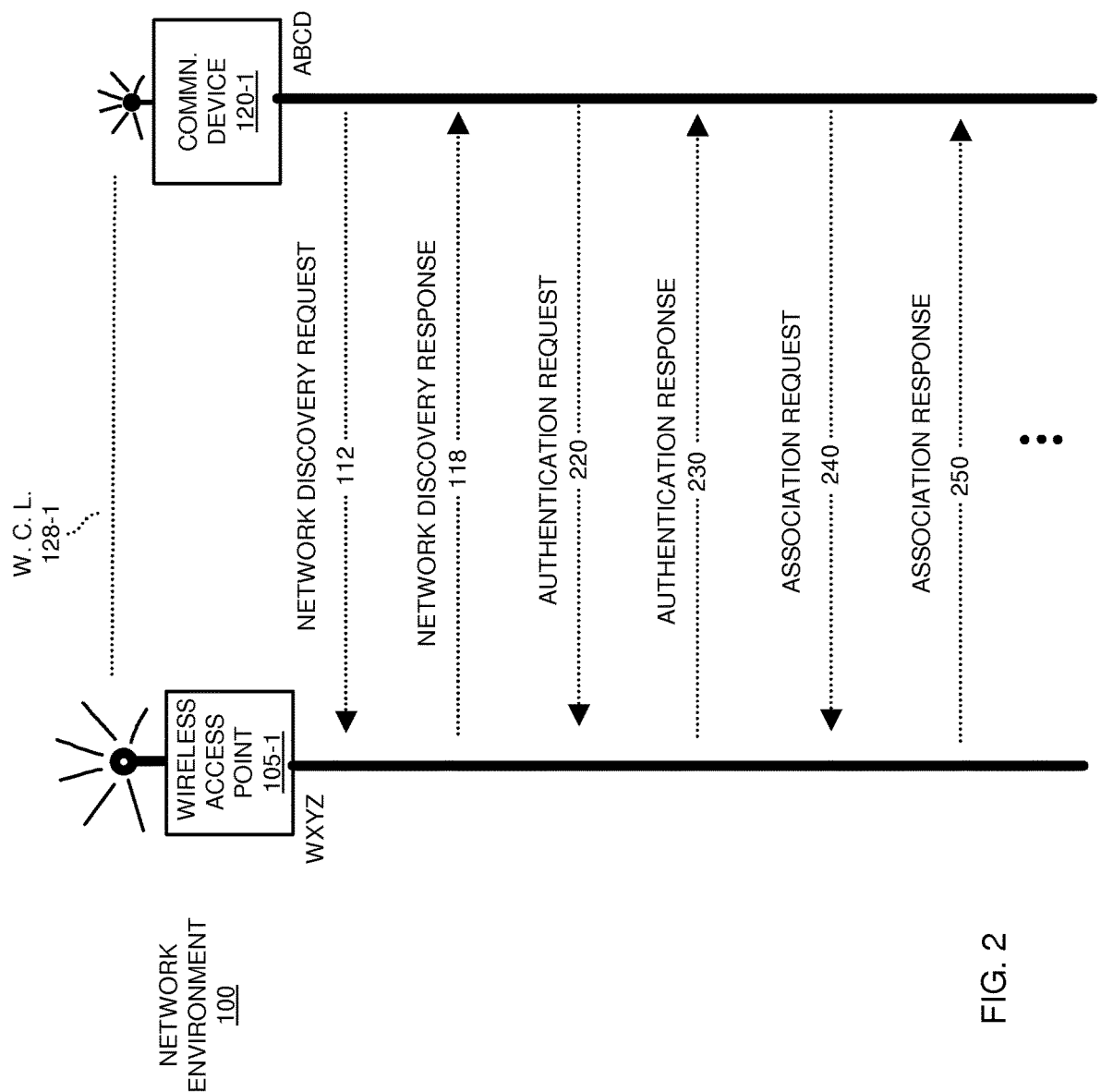
FIG. 2 is an example diagram illustrating communications between a mobile communication device and a non-beacon generating wireless access point according to embodiments herein.

FIG. 2 is an example diagram illustrating communications between a mobile communication device and a non-beacon generating wireless access point according to embodiments herein.

As shown, via communications from the communication device 120-1, the communication device 120-1 transmits the network discovery request 112 as one or more wireless communications to the wireless access point 105-1. Discussion of communications 220, 230, 240, and 250 are further discussed below.

Figure 3:
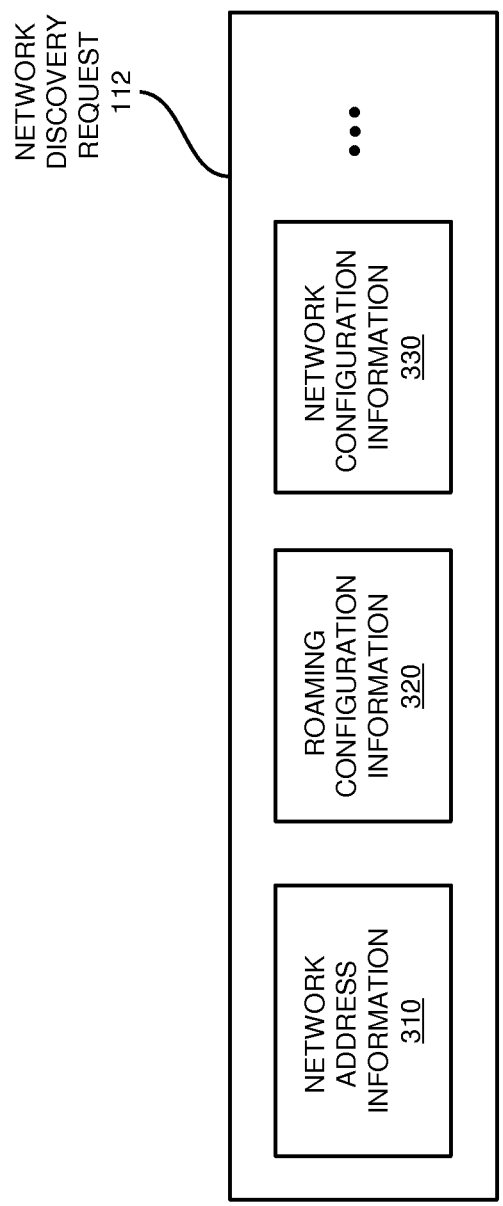
FIG. 3 is an example diagram illustrating contents of a network discovery request according to embodiments herein.

FIG. 3 is an example diagram illustrating different types of information that can be included in the network discovery request 112.

With reference to both FIGS. 1 and 3, in one embodiment, the network discovery request 112 includes network address information 310 indicating the network address ABCD such as a MAC (Media Access Control) address, IP (Internet Protocol) address, etc., assigned to the communication device 120-1. Accordingly, via the network address information 310, the wireless access point 105-1 is able to identify and identity the communication device 120-1 inquiring about availability of wireless access points in network environment 100.

Additionally or alternatively, note that the network discovery request 112 can include roaming configuration information 320. In one embodiment, the roaming configuration information 320 includes passpoint information indicating that the communication device 120-1 is passpoint enabled and thus supports passpoint technology. The passpoint technology supports roaming Wi-Fi connectivity amongst one or more service providers as discussed later in the specification.

Additionally or alternatively, the network discovery request 112 can include network configuration information 330. In one embodiment, the network configuration information 330 indicates criteria of different types of networks in which the user 108-1 of communication device 120-1 desires to connect when establishing a corresponding wireless communication link. In other words, the network discovery request 112 can be generated to specify attributes of network types to which the end user communication device prefers to establish a wireless communication link with a respective wireless access point.

Accordingly, the network discovery request 112 can include useful information for expediting generation of corresponding wireless communication link 128-1 between the wireless access point 105-1 and the communication device 120-1.

Referring again to FIG. 2, in response to receiving the network discovery request 112, the non-beacon-generating wireless access point 105-1 transmits the network discovery response 118 to the communication device 120-1.

Figure 4:
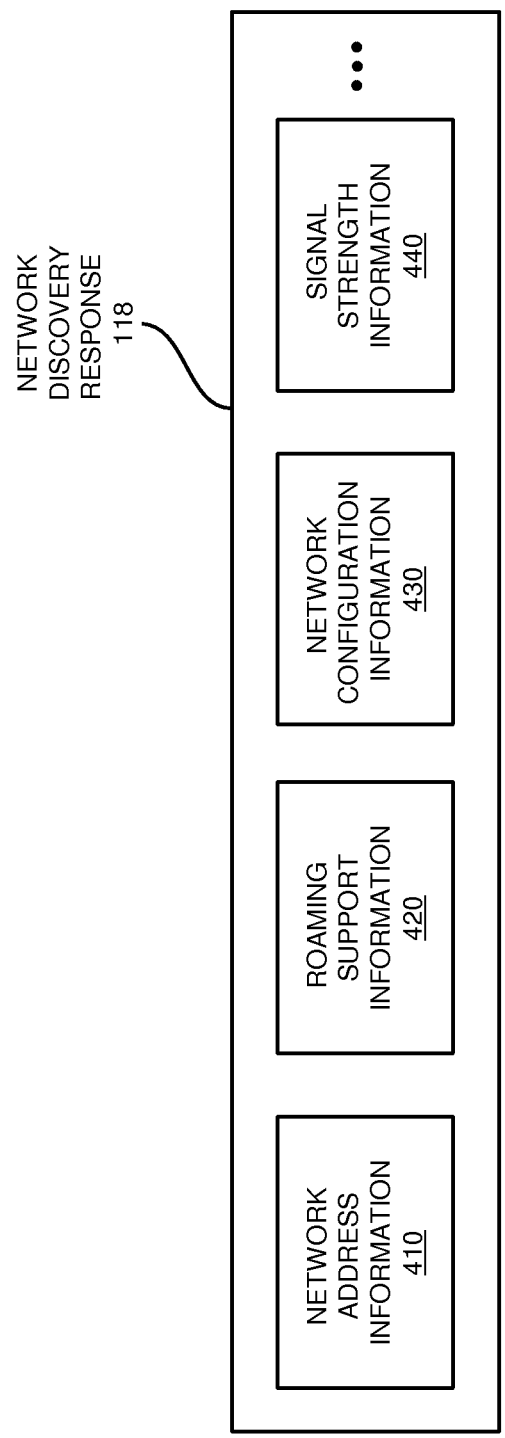
FIG. 4 is an example diagram illustrating contents of a network discovery response according to embodiments herein.

FIG. 4 is an example diagram illustrating different types of information that can be included in the network discovery response 118.

With reference to a combination of FIGS. 1-4, in one embodiment, the network discovery response 118 includes network address information 410 indicating the network address WXYZ such as a MAC (Media Access Control) address, IP (Internet Protocol) address, etc., assigned to the wireless access point 105-1.

Accordingly, via the network address information 410, the wireless access point 105-1 is able to identify and identity of the communication device 120-1 inquiring as to the availability of wireless access points in network environment 100.

Additionally or alternatively, the network discovery response 118 can include roaming support information 420. In one embodiment, the roaming (handout) support information 420 indicates one or more service providers supported by the wireless access point 105-1. Via the roaming support information 420 (such as passpoint information), the communication device 120-1 is able to identify whether the communication device 120-1 is able to establish a wireless connection with the wireless access point 105-1, perform a handoff to the wireless access point 105-1, etc.

Additionally or alternatively, the network discovery response 118 can include network configuration information 430. In one embodiment, the network configuration information 430 indicates attributes of different types of networks (fee-based services networks, subscription-based services networks, etc.) supported by the non-beacon-generating wireless access point 105-1. In other words, the network discovery response 118 can be generated to specify attributes of network types to which the end user communication device 120-1 is able to establish a wireless communication link 128-1.

Additionally or alternatively, the network discovery response 118 can include signal strength information 440 indicating a relative signal strength in which the wireless access point 105-1 receives the network discovery request 112 from the communication device 120-1.

For example, in one embodiment, the non-beacon-generating wireless access point includes a power monitor resource to measure a wireless power level of receiving the network discovery request 112 from the communication device 120-1. The communication management resource 140 produces the network discovery response 118 to include power signal level information indicating the measured wireless power level at which the non-beacon-generating wireless access point 105-1 received the network discovery request 112.

As further discussed below, the communication device 120-1 can be configured to use the signal strength information 440 has at least one parameter in which to decide whether or not to establish a corresponding communication link 128-1 with the wireless access point 105-1.

Accordingly, in contrast to conventional beacons, the network discovery response 118 as described herein can include useful information for expediting generation of corresponding wireless communication link 128-1 between the wireless access point 105-1 and the communication device 120-1.

Referring again to a combination of FIGS. 1 and 2, subsequent to receiving the network discovery response 118, the communication management resource 170 uses the information in the network discovery response 118 to make a decision whether to establish wireless communication link 128-1.

Assume, in this example embodiment, that the communication device 120-1 chooses to go forward and establish wireless communication link 128-1 with wireless access point 105-1. As further shown, in furtherance of establishing the wireless communication link 128-1, the communication device 128-1 transmits communications 220 (such as an authentication request) to the wireless access point 105-1.

In turn, in response to receiving the authentication request 220, the wireless access point 105-1 initiates authentication of the communication device 120-1 with an appropriate remote authentication server. Via communications 230 (such as an authentication response), the wireless access point 105-1 communicates an authentication response to the communication device 120-1.

Subsequent to authentication, via communications 240 (such as an association request), the communication device 120-1 transmits an association request to the wireless access point 105-1 to establish the wireless communication link 128-1. Via further communications 250 (such as an association response), the wireless access point 105-1 transmits an association response (communications 250) to the communication device 120-1.

Subsequent to establishing the wireless communication link 128-1, the communication device 120-1 is now able to communicate over wireless communication link 128-1 through the wireless access point 105-1 and gateway resource to access network 190 such as the Internet.

Note that each mobile communication device in network environment 100 can be equipped to communicate in a wireless manner with an available access point. In one non-limiting example embodiment, each of one or more wireless access points and corresponding mobile communication devices in network environment 100 supports communications over a respective wireless communication links via any suitable protocol. By way of non-limiting example embodiment, a mobile communication device in a respective wireless access point can communicate in accordance with WiFi™ standards such as IEEE (Institute of Electrical and Electronics Engineers) 802.11a, 802.11b, 802.11g, 802.11n, 802ac, etc.

Referring again to FIG. 1, subsequent to authentication of the communication device 120-1, a combination of the wireless access point 105-1 and the gateway resource 160 controls access to network 190. For example, the wireless access point 105-1 is communicatively coupled (such as via a hardwired or wireless communication link) to gateway resource 160. In an upstream direction, such as in a direction outbound from the communication device 120-1, when network access is granted to the mobile communication device 120-1, wireless access point 105-1 facilitates forwarding of communications from communication device 120-1 upstream through access point 105-1 to gateway resource 160. Thereafter, gateway resource 160 controls forwarding of the respective communications to network 190.

Conversely, in a downstream direction, inbound to the communication device 120-1, the gateway resource 160 facilitates distribution of communications received from resources in network 190 downstream to wireless access point 105-1. Wireless access point 105-1 further transmits the received communications to the appropriate communication device (such as communication device 120-1) to which the communications are addressed.

Figure 5:
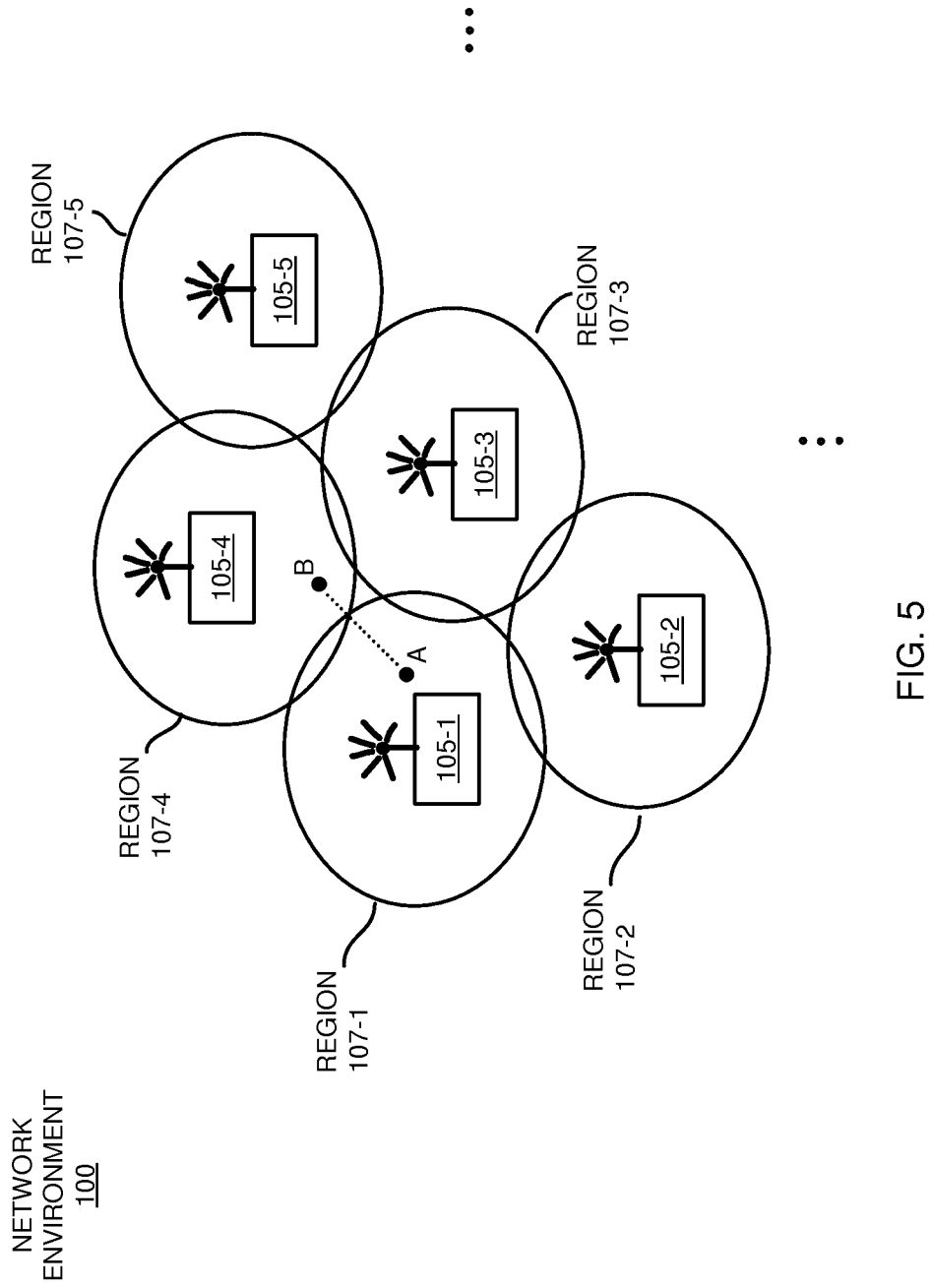
FIG. 5 is an example diagram illustrating movement of the mobile communication device and corresponding wireless coverage region supported by multiple non-beacon generating wireless access points according to embodiments herein.

FIG. 5 is an example diagram illustrating movement of a mobile communication device in a network environment and corresponding wireless coverage region supported by multiple non-beacon generating wireless access points according to embodiments herein.

With reference to a combination of FIGS. 2 and 5, network environment 100 includes multiple wireless access points including non-beacon-generating wireless access point 105-1, non-beacon-generating wireless access point 105-2, non-beacon-generating wireless access point 105-3, non-beacon-generating wireless access point 105-4, non-beacon-generating wireless access point 105-5, etc.

Each of the non-beacon-generating wireless access points 105 provides wireless coverage to one or more respective users within wireless range. For example, the wireless access point 105-1 provides wireless network connectivity to communication devices in region of wireless coverage 107-1; wireless access point 105-2 provides wireless network connectivity to communication devices in a region of wireless coverage 107-2; wireless access point 105-3 provides wireless network connectivity to communication devices in a region of wireless coverage 107-3; wireless access point 105-4 provides wireless network connectivity to communication devices in region of wireless coverage 107-4; wireless access point 105-5 provides wireless network connectivity to communication devices in region of wireless coverage 107-5; and so on.

In this example embodiment, assume that the communication device 120-1 originally resides at location A (within region 107-1) and roams to location B (within region 107-4). As the communication device 120-1 moves from location A to location B, due to wireless signal attenuation, the ability of the communication device 120-1 to communicate with the wireless access point 105-1 diminishes.

Figure 6:
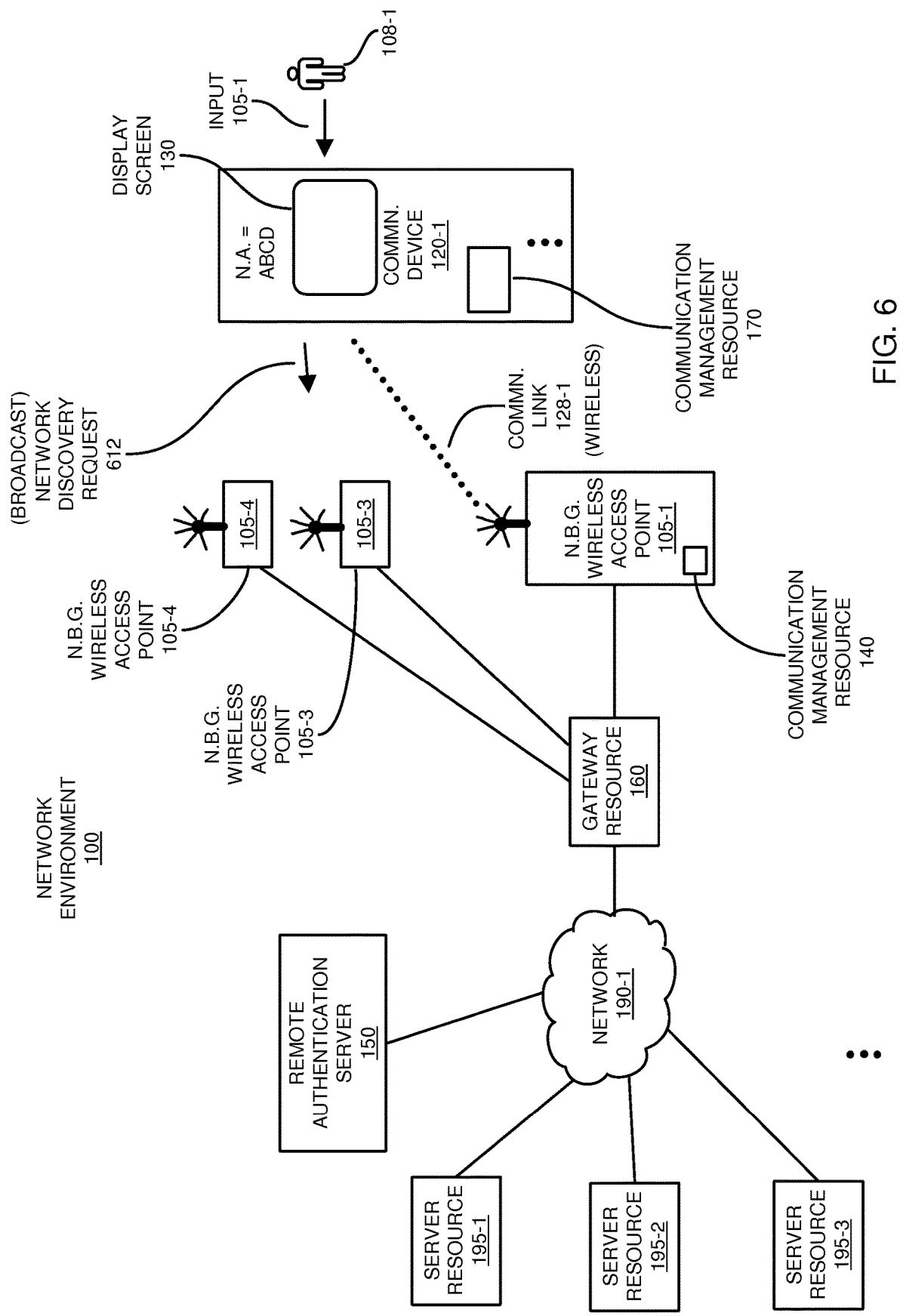
FIG. 6 is an example diagram illustrating network discovery and selection of a non-beacon-generating wireless access point according to embodiments herein.

FIG. 6 is an example diagram illustrating further network discovery according to embodiments herein.

In one embodiment, subsequent to establishing the wireless communication link 128-1, the communication management resource 170 continuously monitors a signal strength of receiving wireless communications such as additional network discovery request messages from the communication device 120-1 or messages from the wireless access point 105-1 over the wireless communication link 128-1.

The signal strength (quality) of wireless communications can be determined in any suitable manner.

For example, in one embodiment, the communication management resource 170 monitors a power level (such as RSSI or Received Signal Strength Indicator) of receiving wireless communications received from the non-beacon-generating wireless access point 105-1. Additionally or alternatively, the communication management resource 170 can be configured to indirectly determine signal strength based upon session information such as a number of lost data packets, etc.

In one non-limiting example embodiment, in response to detecting that the signal strength of wireless communications received from the wireless access point 105-1 over corresponding communication link 128-1 falls below a threshold level, the communication management resource 170 initiates broadcast of network discovery request 612 in the network environment 100 to identify one or more other candidate (non-beacon-generating) wireless access points in network environment 100 in which to potentially perform a handoff.

In such an instance, as shown in FIG. 6, assume that multiple wireless access points including non-beacon-generating wireless access point 105-1, wireless access point 105-3, and non-beacon-generating wireless access point 105-4 receives the network discovery request 612.

Figure 7:
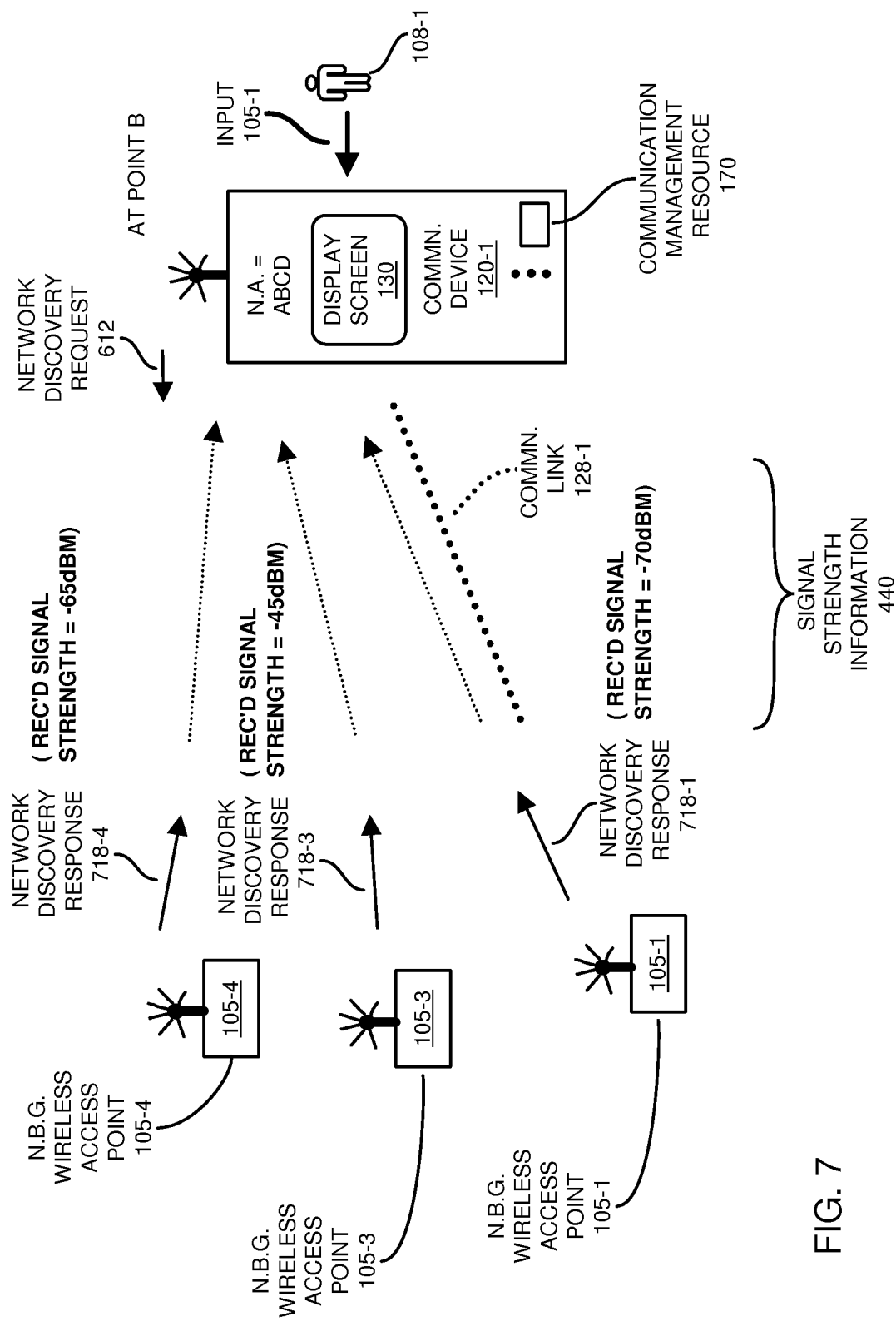
FIG. 7 is an example diagram illustrating receipt of multiple network discovery responses from respective non-beacon generating wireless access points in a network environment according to embodiments herein.

As further discussed below, FIG. 7 is an example diagram illustrating generation of a network discovery response from each of multiple non-beacon generating wireless access points according to embodiments herein.

With reference to FIGS. 1, 4, 6, and 7, in a similar manner as previously discussed, each of multiple wireless access points 105 receives the network discovery request 612.

For example, while the communication link 128-1 is still established between the communication device 120-1 and the wireless access point 105-1, in response to receiving the network discovery request 612, the non-beacon generating wireless access point 105-1 generates and broadcasts network discovery response 718-1 to the communication device 120-1. As previously discussed, the wireless access point 105-1 can be configured to monitor a signal strength of receiving the communications including network discovery request 612. Based upon the detected signal strength of receiving the network discovery request 612, the wireless access point 105-1 generates the network discovery response 718-1 to include a signal strength value (signal strength information 440) indicating a strength at which the wireless access point 105-1 received the network discovery request 612. In this example embodiment, as shown, assume that the network discovery response 718-1 includes signal strength information 440 (such as power signal strength information) indicating that the non-beacon-generating wireless access point 105-1 receives the network discovery request 612 at a relative received signal strength of −70 dBm (providing only fair reception).

While the communication link 128-1 is still established between the communication device 120-1 and the wireless access point 105-1, in response to receiving the network discovery request 612, the non-beacon generating wireless access point 105-3 generates and broadcasts network discovery response 718-3 to the communication device 120-1. In a similar manner as previously discussed, the wireless access point 105-3 can be configured to monitor a signal strength of receiving wireless communications including network discovery request 612. Based upon the detected signal strength of the non-beacon-generating wireless access point 105-3 receiving the network discovery request 612, the non-beacon generating wireless access point 105-3 generates the network discovery response 718-3 to include a signal strength value signal (strength information 440) indicating a strength at which the wireless access point 105-3 received the network discovery request 612. In this example embodiment, as shown, assume that the network discovery response 718-3 includes signal strength information 440 (such as power signal strength information) indicating that the non-beacon-generating wireless access point 105-3 receives the network discovery request 612 at a relative signal strength of −45 dBm.

While the communication link 128-1 is still established between the communication device 120-1 and the wireless access point 105-1, in response to receiving the network discovery request 612, the non-beacon generating wireless access point 105-4 generates and broadcasts network discovery response 718-4 to the communication device 120-1. In a similar manner as previously discussed, the wireless access point 105-4 can be configured to monitor a signal strength of receiving wireless communications including network discovery request 612. Based upon the detected signal strength of receiving the network discovery request 612, the non-beacon generating wireless access point 105-4 generates the network discovery response 718-4 to include a signal strength value (signal strength information 440) indicating a strength at which the wireless access point 105-4 received the network discovery request 612. In this example embodiment, as shown, assume that the network discovery response 718-4 includes signal strength information 440 (such as power signal strength information) indicating that the non-beacon-generating wireless access point 105-4 receives the network discovery request 612 at a relative signal strength of −65 dBm.

Accordingly, as a response to the broadcasted network discovery request message 612, the communication management resource 170 receives network discovery response messages from multiple non-beacon-generating wireless access points in the wireless network environment. As previously discussed, each of the network discovery responses 718-1, 718-3, and 718-4 (messages) indicates respective power level −70 dBm, −45 dBm, and −65 dBm of receiving the respective network discovery request 612.

In accordance with further embodiments, the communication management resource 170 analyzes the network discovery responses to identify a particular non-beacon-generating wireless access point of the multiple non-beacon-generating wireless access points in which to establish a new wireless communication link. In one embodiment, the communication management resource 170 compares the received signal strength information as specified by the network discovery responses 718-1, 718-3, and 718-4 to identify which of the multiple candidate non-beacon generating wireless access points 105-1, 105-3, and 105-4, is best suited to provide the communication device 120-1 access to network 190.

Assume that the communication management resource 170 is configured with a threshold value of −67 dBm, below which the communication link between the communication device 120-1 and respective wireless access point is fair or poor. The communication management resource 170 utilizes the threshold value as a basis to select amongst the multiple candidate wireless access points to establish a respective new wireless communication link.

In this example, because both non-beacon generating wireless access point 105-3 non-beacon generating wireless access point 105-4 have a signal strength greater than the threshold value of −67 dBm, and because they both provide a better signal strength than wireless access point 105-1, both wireless access point 105-3 and wireless access point 105-4 are good candidates in which to perform a respective handoff in which the wireless communication link 128-1 is dropped and a new wireless communication link is established with the selected wireless access point. (Note that the less negative value indicates better signal strength.)

In one embodiment, because the non-beacon generating wireless access point 105-3 indicates a greater received signal strength of −45 dBm (which is a better signal strength than −65 dBm associated with wireless access point 105-4), the communication management resource 170 selects the non-beacon generating wireless access point 105-3 to establish the new wireless communication link. In such an instance, because the wireless access point 105-3 indicates the highest received signal strength, the communication device 120-1 initiates a handoff of wireless communication link 128-1 from wireless access point 105-1 to wireless access point 105-3.

As previously discussed, note again that each network discovery response message can further include roaming support information 420. In addition to or as an alternative to using the signal strength information 440 in each network discovery response as previously discussed to determine which of multiple candidate non-beacon generating wireless access points in which to establish a wireless communication link, embodiments herein can further include using the roaming support information 420 in each of the respective network discovery response messages to determine which of the multiple candidate wireless access points to establish a new wireless communication link and perform a handoff.

For example, as previously discussed, due to good signal reception, both non-beacon generating wireless access point 105-3 and non-beacon generating wireless access point 105-4 are good candidates in which to perform a respective handoff. However, the communication management resource 170 can be configured to analyze the roaming support information 420 in network discovery response 718-3 to determine that the user 108-1 is not a subscriber to service providers providing services via wireless access point 105-3. Assume further that the communication management resource 170 analyzes the roaming support information 420 in network discovery response 718-4 and determines that the user 108-1 is a subscriber to a respective service provider providing services though wireless access point 105-4. In such an instance, the communication management resource 170 selects the wireless access point 105-4, instead of wireless access point 105-3, in which to establish the new wireless communication link to perform a handoff.

As previously discussed, note that the network discovery request 612 can be a single wireless message. Each of the respective network discovery responses may be a single wireless message as well. Inclusion of the different types of information in the network discovery request messages and network discovery response messages enables the communication device 120-1 to more quickly establish a wireless communication link.

Figure 8:
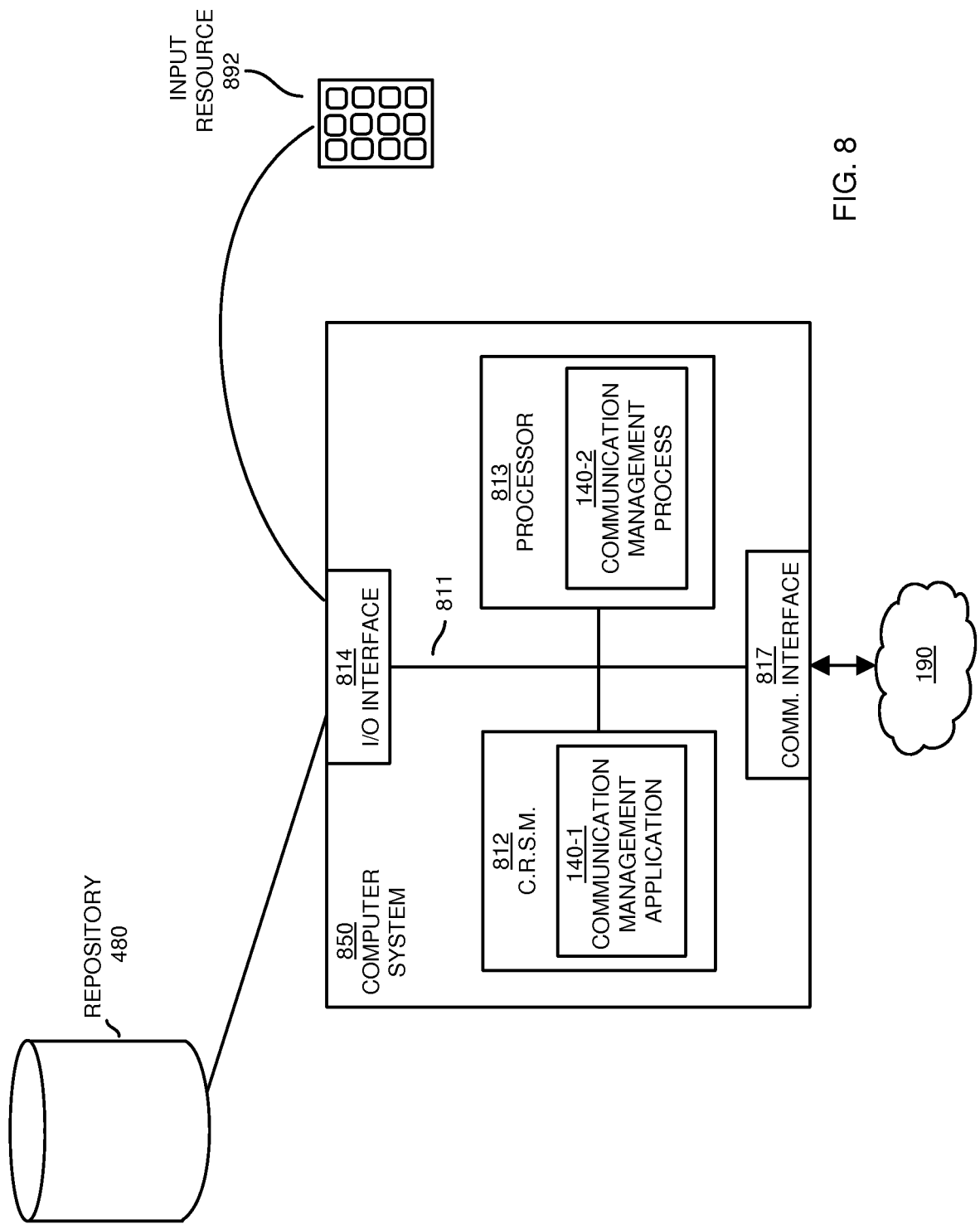
FIG. 8 is an example diagram illustrating a computer system to carry out operations according to embodiments herein.

FIG. 8 is a diagram illustrating an example computer architecture in which to execute any of the functionality according to embodiments herein.

With further reference to FIGS. 1 and 8, note that any of the different processing techniques (such as those provided by communication management resource 140, communication management resource 170, etc.) can be implemented via execution of software code on computer processor hardware as discussed below.

For example, as shown, computer system 850 (e.g., computer processor hardware) of the present example includes an interconnect 811 that couples computer readable storage media 812 such as a non-transitory type of media (i.e., any type of hardware storage medium) in which digital information can be stored and retrieved. The computer system 850 can further include processor resource 813 (i.e., computer processor hardware such as one or more processor co-located or disparately located processor devices), I/O interface 814, communications interface 817, etc.

Computer system 850 can be located at any suitable locations in network environment 100 to carry out the operations as discussed herein. For example, computer processor hardware (i.e., processor resource 813 and/or computer system 850) and/or communication management application 140-1 can be located in a single location or can be distributed amongst multiple locations. As previously discussed, the processor resource 813 can be configured to execute the operations as discussed with respect to any resources including communication management resource 140, communication management resource 170, etc.

As its name suggests, I/O interface 814 provides connectivity to resources such as repository 480, input resource 892, one or more display screens, etc.

Computer readable storage medium 812 can be any hardware storage device to store data such as memory, optical storage, hard drive, floppy disk, etc. In one embodiment, the computer readable storage medium 812 stores instructions and/or data associated with communication management application 140-1.

Communications interface 817 enables the computer system 850 and processor resource 813 to communicate over a resource such as network 190. I/O interface 814 enables processor resource 813 to access data from a local or remote location, control a respective display screen, receive input, etc.

As shown, computer readable storage media 812 can be encoded with communication management application 140-1 (e.g., software, firmware, etc.) executed by processor resource 813. Communication management application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in communication management application 140-1 stored on computer readable storage medium 812.

Execution of the communication management application 140-1 produces processing functionality such as communication management process 140-2 in processor resource 813. In other words, the communication management process 140-2 associated with processor resource 813 represents one or more aspects of executing communication management application 140-1 within or upon the processor resource 813 in the computer system 850.

Those skilled in the art will understand that the computer system 850 can include other processes and/or software and hardware components, such as an operating system that controls allocation and use of hardware resources to execute communication management application 140-1.

In accordance with different embodiments, note that computer system may be any of various types of devices, including, but not limited to, a wireless access point, a communication device, computer device, a set-top box, access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, etc., or in general any type of computing or electronic device.

The computer system 850 may reside at any location or multiple locations in network environment 100. The computer system 850 can be included in any suitable resource in network environment 100 to implement any of the functionality as discussed herein.

Note that each of the other functions as discussed herein can be executed in a respective computer system based on execution of corresponding instructions. For example, communication device 120-1 can include respective computer readable storage medium on which instructions are stored; processor hardware in the communication device 120-1 execute the instructions to perform operations as described herein.

Functionality supported by the different resources will now be discussed via flowcharts in FIGS. 9 and 10. Note that the steps in the flowcharts below can be executed in any suitable order.

Figure 9:
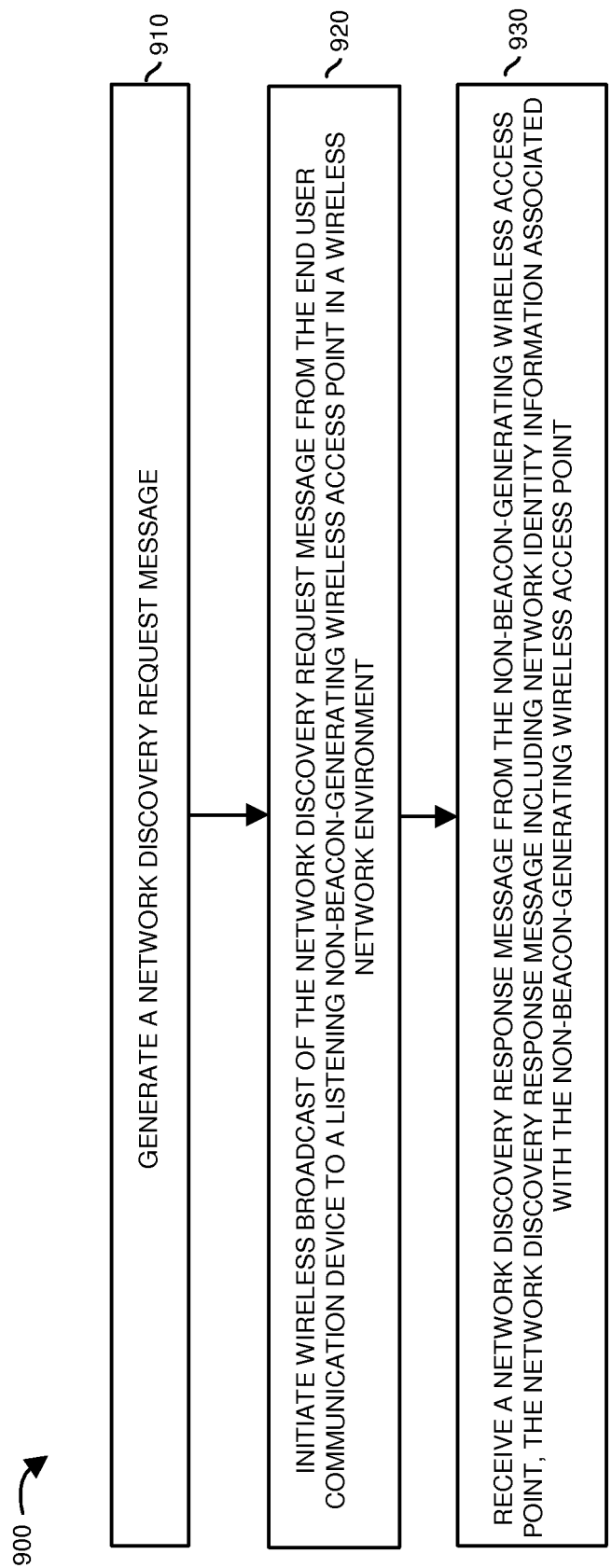
FIG. 9 is an example diagram illustrating a method according to embodiments herein.

FIG. 9 is a flowchart 900 illustrating an example method according to embodiments. Note that there will be some overlap with respect to concepts as discussed above.

In processing operation 910, the communication management resource 170 generates a network discovery request 112 (message).

In processing operation 920, the communication management resource 170 initiates wireless broadcast of the network discovery request 112 (message) from the end user communication device 120-1 to a listening non-beacon-generating wireless access point 105-1 disposed in wireless network environment 100.

In processing operation 930, the communication management resource 170 receives a network discovery response 118 (message) from the non-beacon-generating wireless access point 105-1. The network discovery response 118 includes network identity information (such as SSID information, service provider information, etc.) of one or more networks associated with or supported by the non-beacon-generating wireless access point 105-1.

Figure 10:
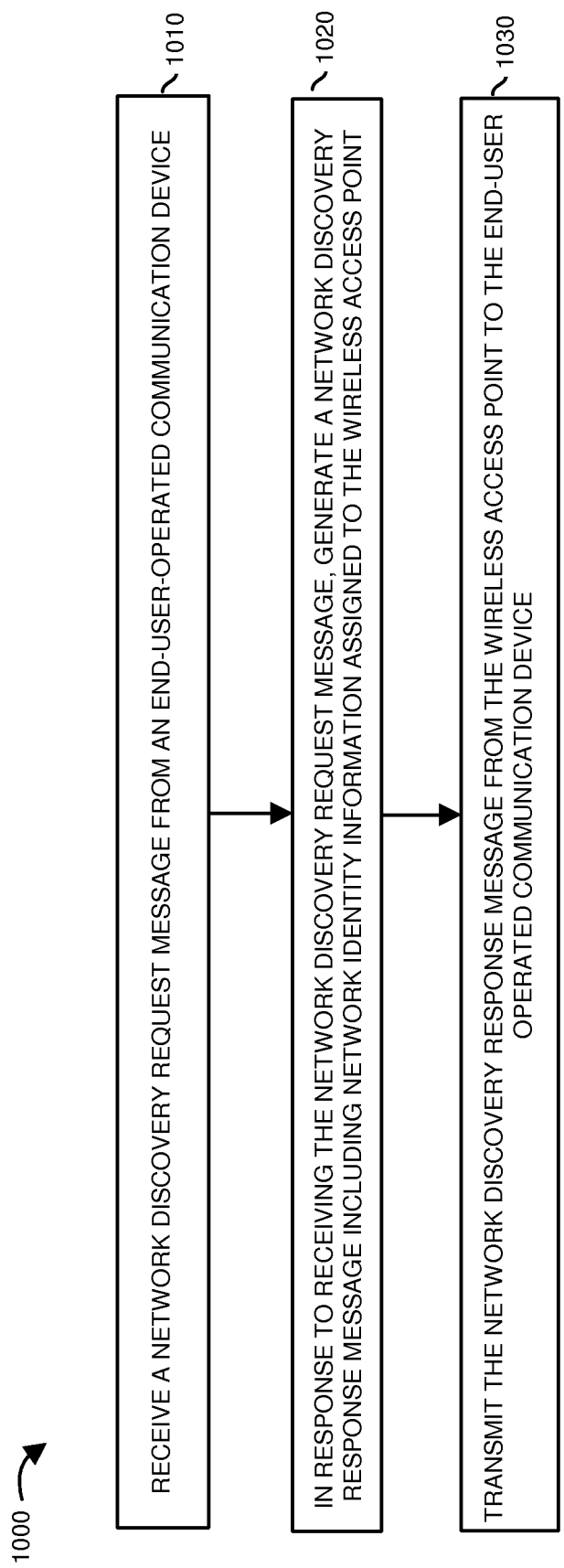
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the communication management resource 140 in non-beacon-generating wireless access point 105-1 receives a network discovery request 112 from end-user-operated communication device 120-1. In one embodiment, as previously discussed, the wireless access point 105-1 is configured to prevent non-solicited transmission of wireless communications indicating presence of wireless access point in network environment 100. In other words, in contrast to conventional techniques, the wireless access point 105-1 does not automatically transmit beacons in network environment 100 every 100 milliseconds indicating its presence. Instead, the wireless access point 105-1 provides notification of its presence when solicited by an end user communication device as further discussed below.

In processing operation 1020, in response to receiving the network discovery request 112, the non-beacon-generating wireless access point 105-1 generates a network discovery response 118. The network discovery response 118 includes network identity information assigned to the wireless access point 105-1.

In processing operation 1030, the non-beacon generating wireless access point 105-1 wirelessly transmits the network discovery response 118 to the end-user operated communication device 120-1.

Note again that techniques herein are well suited for providing more efficient notification of access point availability, resulting in better use of wireless bandwidth. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
at a communication device operated by a user:
generating a network discovery request message, the network discovery request message indicating attributes of different types of networks to which the user of the communication device desires to establish a wireless communication link;
initiating wireless broadcast of the network discovery request message in a wireless network environment, the network discovery request message received by a non-beacon-generating wireless access point in the wireless network environment;
receiving a network discovery response message from the non-beacon-generating wireless access point, the network discovery response message including network identity information associated with the non-beacon-generating wireless access point, the network discovery response message further including signal strength information indicating a wireless signal strength at which the non-beacon-generating wireless access point received the network discovery request message;
wherein the non-beacon generating wireless access point is a first non-beacon-generating wireless access point in the wireless network environment, the method further comprising:
generating a subsequent network discovery request message in response to detecting that a signal strength of wireless communications received from the first non-beacon-generating wireless access point are below a threshold level;
receiving a response from second non-beacon-generating wireless access point in which corresponding received communications from the second non-beacon-generating wireless access point are above the threshold level; and
performing a wireless communication link handoff from the first non-beacon-generating wireless access point to the second non-beacon-generating wireless access point.

2. The method as in claim 1, wherein the first non-beacon-generating wireless access point measures a wireless power level of receiving the network discovery request message, the network discovery response message including power information indicating the measured wireless power level at which the first non-beacon-generating wireless access point received the network discovery request message.

3. The method as in claim 2 further comprising:
as a response to the broadcasted network discovery request message, receiving network discovery response messages from multiple non-beacon-generating wireless access points in the wireless network environment, each of the network discovery response messages indicating a power level of receiving the respective network discovery request message; and
analyzing the network discovery response messages to identify a non-beacon-generating wireless access point of the multiple non-beacon-generating wireless access points in which to establish a wireless communication link.

4. The method as in claim 1, wherein the network discovery response message includes information indicating attributes of types of different networks supported by the first non-beacon-generating wireless access point.

5. The method as in claim 1 further comprising:
repeatedly broadcasting the wireless network discovery request message in the wireless network environment to elicit generation of a network discovery response message by the first non-beacon-generating wireless access point.

6. The method as in claim 1 further comprising:
using roaming support information received in the network discovery response message to determine which of multiple non-beacon-generating wireless access points to establish a wireless communication link.

7. The method as in claim 1, wherein the communication device is operable to determine a signal strength of receiving communications from the first non-beacon-generating wireless access point.

8. The method as in claim 7, wherein the communication device determines the signal strength based upon a number of lost data packets.

9. The method as in claim 1, wherein the network discovery response message includes attributes of networks supported by the first non-beacon-generating wireless access point.

10. A method comprising:
at a communication device operated by a user:
generating a network discovery request message, the network discovery request message indicating attributes of different types of networks to which the user of the communication device desires to establish a wireless communication link;
initiating wireless broadcast of the network discovery request message in a wireless network environment, the network discovery request message received by a non-beacon-generating wireless access point in the wireless network environment; and
receiving a network discovery response message from the non-beacon-generating wireless access point, the network discovery response message including network identity information associated with the non-beacon-generating wireless access point, the network discovery response message further including signal strength information indicating a wireless signal strength at which the non-beacon-generating wireless access point received the network discovery request message;
wherein the network discovery request message indicates that the communication device is passpoint enabled to support passpoint handoffs; and
wherein the network discovery response message indicates multiple network service providers supported by the wireless access point.

11. A system comprising:
a wireless access point comprising:
a first wireless communication interface to wirelessly communicate with multiple communication devices in a network environment, the first wireless communication interface being a passive interface configured to prevent non-solicited transmission of wireless communications indicating a presence of the wireless access point in the network environment;
a power monitor resource, the power monitor resource measuring a wireless power level of receiving a network discovery request message over the first wireless communication interface from a communication device in the network environment;
a second communication interface to communicate with a remote network;
a communication management resource to facilitate conveying communications between the multiple communication devices and the remote network; and
wherein the network discovery request message indicates that the communication device supports passpoint, the communication management resource operable to produce a network discovery response message to include information indicating multiple service providers supported by the wireless access point.

12. The system as in claim 11 further comprising:
the communication management resource operable to produce the network discovery response message to include power signal level information indicating the measured wireless power level at which the wireless access point received the network discovery request message.

13. The system as in claim 12, wherein the communication management resource is operable to produce the network discovery response message to include information indicating attributes of types of different networks supported by the wireless access point.

14. The system as in claim 12, wherein the communication management resource is operable to produce the network discovery response message to include network identity information assigned to the wireless access point in response to receiving the network discovery request message.

* * * * *

UNITED STATES PATENT AND TRADEMARK OFFICE
CERTIFICATE OF CORRECTION

| | | |
|---|---|---|
| PATENT NO. | : 11,375,437 B2 | Page 1 of 1 |
| APPLICATION NO. | : 14/877130 | |
| DATED | : June 28, 2022 | |
| INVENTOR(S) | : Don Gunasekara, Laxman Nallani and Ahmed Bencheikh | |

It is certified that error appears in the above-identified patent and that said Letters Patent is hereby corrected as shown below:

In the Claims

Column 18, Line 33, Claim 1, after "form" add --a--

Signed and Sealed this
Twentieth Day of September, 2022

Katherine Kelly Vidal
*Director of the United States Patent and Trademark Office*